United States Patent
Xu et al.

(10) Patent No.: US 11,344,010 B2
(45) Date of Patent: May 31, 2022

(54) DIP NET PROVIDED WITH LOCKABLE AND FOLDABLE HANDLE

(71) Applicant: HANGZHOU FUFAN INDUSTRY CO., LTD., Hangzhou (CN)

(72) Inventors: Hongjian Xu, Hangzhou (CN); Shu Lin, Hangzhou (CN); Linrong Hong, Hangzhou (CN); Huihai Ge, Hangzhou (CN); Xiong Li, Hangzhou (CN)

(73) Assignee: HANGZHOU FUFAN INDUSTRY CO., LTD., Hangzhou (CN)

( * ) Notice: Subject to any disclaimer, the term of this patent is extended or adjusted under 35 U.S.C. 154(b) by 394 days.

(21) Appl. No.: 16/453,792

(22) Filed: Jun. 26, 2019

(65) Prior Publication Data
US 2020/0404893 A1   Dec. 31, 2020

(51) Int. Cl.
*A01K 77/00* (2006.01)
*A01K 97/00* (2006.01)

(52) U.S. Cl.
CPC .............. *A01K 77/00* (2013.01); *A01K 97/00* (2013.01)

(58) Field of Classification Search
CPC ........................................................ A01K 77/00
USPC ....................................................... 43/11, 12
See application file for complete search history.

(56) References Cited

U.S. PATENT DOCUMENTS

| | | | | |
|---|---|---|---|---|
| 520,567 A | * | 5/1894 | Kamp | A01K 77/00 43/12 |
| 723,484 A | * | 3/1903 | Paley | A01K 77/00 43/12 |
| 932,170 A | * | 8/1909 | Pihl | A01K 77/00 43/12 |
| 939,381 A | * | 11/1909 | Barnes | A01K 77/00 43/12 |
| 956,803 A | * | 5/1910 | Fromm | A01K 77/00 43/12 |

(Continued)

FOREIGN PATENT DOCUMENTS

| | | | | |
|---|---|---|---|---|
| FR | 456581 A | * | 8/1913 | ............. A01K 77/00 |
| FR | 931163 A | * | 2/1948 | ............. A01K 77/00 |

(Continued)

OTHER PUBLICATIONS

Translation of JP 2013-230118A (Year: 2013).*
Translation of FR 456581A (Year: 1913).*

*Primary Examiner* — Darren W Ark
(74) *Attorney, Agent, or Firm* — Jiwen Chen; Jacobson Holman PLLC

(57) ABSTRACT

A dip net provided with a lockable and foldable handle comprises a handle, a hoop and a hoop mounting base, wherein the hoop mounting base is fixed to the front end of the handle and comprises a base body, a rotary shaft and a lock device; and the rotary shaft and the lock device are both mounted in the base body; connecting pieces are arranged at two ends of the rear side of the hoop and are respectively connected with two ends of the rotary shaft; the rotary shaft is provided with two clamping grooves in a circumferential direction; when the handle is unfolded, the lock device is matched with one clamping groove to realize locking; and when the handle is folded, the lock device is matched with the other clamping groove to realize locking. The dip net of the invention is more convenient to use and capable of saving time and labor.

8 Claims, 8 Drawing Sheets

(56) References Cited

U.S. PATENT DOCUMENTS

| | | | | |
|---|---|---|---|---|
| 1,184,466 A | * | 5/1916 | Loomis et al. | A01K 77/00 43/12 |
| 1,199,905 A | * | 10/1916 | Kewell | A01K 77/00 43/12 |
| 1,391,841 A | * | 9/1921 | Lewis | A01K 77/00 43/12 |
| 1,668,835 A | * | 5/1928 | Allen | A01K 77/00 43/12 |
| 1,726,715 A | * | 9/1929 | Powell | A01K 77/00 43/12 |
| 1,857,826 A | * | 5/1932 | Slamen | A01K 77/00 43/12 |
| 1,957,944 A | * | 5/1934 | Dexter | A01K 77/00 43/12 |
| 2,040,714 A | * | 5/1936 | Smith | A01K 77/00 43/12 |
| 2,066,439 A | * | 1/1937 | Wine | A01K 77/00 43/12 |
| 2,160,584 A | * | 5/1939 | Garrett | A01K 77/00 43/12 |
| 2,471,273 A | * | 5/1949 | Kincannon | A01K 77/00 43/12 |
| 2,482,157 A | * | 9/1949 | Crot | A01K 77/00 43/12 |
| 2,485,781 A | * | 10/1949 | Schreiber | A01K 77/00 43/12 |
| 2,491,703 A | * | 12/1949 | Bell | A01K 77/00 43/12 |
| 2,539,563 A | * | 1/1951 | Baloun | A01K 77/00 43/12 |
| 2,583,987 A | * | 1/1952 | Baisor | A01K 77/00 43/12 |
| 2,600,773 A | * | 6/1952 | Hungerford | A01K 77/00 43/12 |
| 2,637,133 A | * | 5/1953 | Ross | A01K 77/00 43/12 |
| 2,657,491 A | * | 11/1953 | Ziebell | A01K 77/00 43/12 |
| 2,706,664 A | * | 4/1955 | Conrad | F16B 7/048 403/187 |
| 2,725,657 A | * | 12/1955 | Wiederhold | A01K 77/00 43/12 |
| 2,725,658 A | * | 12/1955 | Wiederhold | A01K 77/00 43/12 |
| 2,739,403 A | * | 3/1956 | Kalmus | A01K 77/00 43/12 |
| 2,817,175 A | * | 12/1957 | Morris | A01K 77/00 43/11 |
| 2,939,238 A | * | 6/1960 | Ertel | A01K 77/00 43/11 |
| 2,954,633 A | * | 10/1960 | Harding | A01K 77/00 43/12 |
| 2,984,038 A | * | 5/1961 | Chapralis | A01K 77/00 43/12 |
| 3,023,530 A | * | 3/1962 | Jacob | A01K 77/00 43/12 |
| 3,030,725 A | * | 4/1962 | Sandul | A01K 77/00 43/12 |
| 3,032,908 A | * | 5/1962 | Cohen | A01K 77/00 43/12 |
| 3,077,693 A | * | 2/1963 | Wallin | A01K 77/00 43/11 |
| 3,223,189 A | * | 12/1965 | Robbins | A01K 77/00 177/149 |
| 3,670,444 A | * | 6/1972 | Dieterich | A01K 77/00 43/12 |
| 3,815,272 A | * | 6/1974 | Marleau | A01K 77/00 43/12 |
| 3,849,926 A | * | 11/1974 | Fox | A01K 77/00 43/11 |
| 4,050,177 A | * | 9/1977 | Gerritsen | A01K 77/00 43/12 |
| 4,263,864 A | * | 4/1981 | Carter, Jr. | A01K 77/00 114/221 R |
| 4,653,214 A | * | 3/1987 | Cline | A01K 77/00 43/11 |
| 5,099,597 A | * | 3/1992 | Whistle | A01K 77/00 43/11 |
| 5,605,003 A | * | 2/1997 | Krc | A01K 77/00 43/12 |
| 6,546,664 B1 | * | 4/2003 | Busboom | A01K 77/00 43/12 |
| 7,395,629 B1 | * | 7/2008 | Thomas | A01K 77/00 43/11 |
| 7,934,337 B1 | * | 5/2011 | Lambert | A01K 77/00 43/12 |
| 8,857,098 B2 | * | 10/2014 | Marks | A01K 77/00 43/12 |
| 2006/0005452 A1 | * | 1/2006 | McIntyre | A01K 77/00 43/11 |
| 2006/0185215 A1 | * | 8/2006 | Corbett | A01K 77/00 43/11 |
| 2016/0007580 A1 | * | 1/2016 | Best | A01K 75/04 43/8 |
| 2016/0363476 A1 | * | 12/2016 | Van Komen | G01G 19/414 |
| 2019/0053475 A1 | * | 2/2019 | Xu | A01K 74/00 |
| 2020/0178509 A1 | * | 6/2020 | Vesich | A01K 77/00 |

FOREIGN PATENT DOCUMENTS

| | | | | |
|---|---|---|---|---|
| FR | 1033096 A | * | 7/1953 | E02F 3/7613 |
| FR | 1252691 A | * | 5/1961 | A01K 77/00 |
| FR | 2338773 A1 | * | 8/1977 | B25G 1/04 |
| GB | 425565 A | * | 3/1935 | A01K 77/00 |
| GB | 1122233 A | * | 7/1968 | A01K 77/00 |
| GB | 2098441 A | * | 11/1982 | A01K 77/00 |
| GB | 2290013 A | * | 12/1995 | A01K 77/00 |
| GB | 2325841 A | * | 12/1998 | A01K 77/00 |
| JP | H063070 U | * | 1/1994 | |
| JP | H0728353 U | * | 5/1995 | |
| JP | 08322432 A | * | 12/1996 | |
| JP | 2004016229 A | * | 1/2004 | |
| JP | 2004033060 A | * | 2/2004 | |
| JP | 2005110585 A | * | 4/2005 | |
| JP | 3723251 B2 | * | 12/2005 | |
| JP | 2007124992 A | * | 5/2007 | |
| JP | 2007319011 A | * | 12/2007 | |
| JP | 2013230118 A | * | 11/2013 | |
| JP | 2017184706 A | * | 10/2017 | |
| JP | 2018161077 A | * | 10/2018 | |
| JP | 2021000011 A | * | 1/2021 | |
| KR | 20040024069 A | * | 3/2004 | |
| KR | 20120005871 U | * | 8/2012 | |
| KR | 20150079028 A | * | 7/2015 | |

* cited by examiner

DIP NET PROVIDED WITH LOCKABLE AND FOLDABLE HANDLE

BACKGROUND OF THE INVENTION

1. Technical Field

The present invention relates to the field of fishing tackle, in particular to a dip net provided with a lockable and foldable handle.

2. Description of Related Art

In the fishing process, it is an indispensable step to scoop fish with dip nets. Particularly when big fish are caught, it will be difficult to get the big fish onto the bank without dip nets, and the fish can even escape, which makes all previous labor in vain. For this reason, dip nets are indispensable fishing tackle, of which the structure and quality are particularly important for fishing. Existing dip nets on the market have various defects, for instance, these dip nets have to be assembled on site when used, which will spend a lot of time and labor; and these dip nets are large in size and poor in bearing capacity and are provided with long rods, thereby being inconvenient to carry.

To solve the abovementioned problems, Chinese Patent Application No. 2008201710031 discloses a 360° gear-type fish basket adjustment device which comprises a main body, a right main body gear and a left main body gear, wherein a horizontal hole and a longitudinal hole are formed in the main body in a crossed manner, a lock screw is arranged in the main body in a sleeved manner, a connecting rod is arranged in the right main body gear and horizontally penetrates through the main body and the lock screw to be cooperatively inserted into the left main body gear, a connecting screw is arranged in the left main body gear and is cooperatively screwed in a connecting nut, and the right main body gear and the left main body gear are fixedly connected to two sides of the main body through the connecting screw. According to the 360° gear-type fish basket adjustment device, the main body can be adjusted to any angle through the cooperation between tooth grooves of the left and right main body gears and a tooth groove in the main body; when a fish basket is stored, the fish basket adjustment device can be rotated into the fish basket hoop to guarantee a good appearance and to save the space; and through the cooperation between the lock screw and the lock nut, the fish basket adjustment device can be firmly and reliably locked and is not prone to rotation.

According to the portable dip net disclosed in the above technical solution, the hoop and the net handle can be folded, so that transportation is facilitated; and assembly before use and disassembly after use are not needed, so that using is more convenient. However, in the folding and locking process, the lock screw needs to be rotated to loosen or tighten the left main body gear and the right main body gear, so that operation is inconvenient; and after being used repeatedly, the gears may be worn and have a poor engaging capacity, which in turn results ineffective locking, and consequentially, the stability of the main body is affected in use, and the service life of the fishing tackle is shortened.

BRIEF SUMMARY OF THE INVENTION

The object of the invention is to solve the problems in the prior art by providing a foldable dip net which can be easily folded and unfolded and has a good stability after being locked.

The technical solution provided by the invention to fulfill the above object is as follows:

The invention relates to a dip net provided with a lockable and foldable handle. The dip net comprises a handle, a hoop and a hoop mounting base, wherein the hoop mounting base is fixed to the front end of the handle and comprises a base body, a rotary shaft and a lock device, and the rotary shaft and the lock device are both mounted in the base body; connecting pieces are arranged at two ends of the rear side of the hoop and are respectively connected with two ends of the rotary shaft; the rotary shaft is provided with two clamping grooves in a circumferential direction; when the handle is unfolded, the lock device is matched with one clamping groove to realize locking; and when the handle is folded, the lock device is matched with the other clamping groove to realize locking.

Preferably, the lock device comprises a spring, a lock catch and a buckle, wherein the base body is provided with a buckle sliding groove, and the lock catch and the spring are both mounted in the base body; the rear end of the lock catch is in close contact with the front end of the spring, and a protrusion is arranged at the front end of the lock catch; the buckle is mounted in the buckle sliding groove, is connected with the base body in a manner of sliding forwards or backwards, and is fixed to the lock catch; and the protrusion is matched with one of the clamping grooves.

Preferably, the lock catch is provided with a through hole which vertically penetrates through the lock catch, and a pin is arranged in the buckle and is inserted into the through hole. By adoption of such design, the buckle and the lock catch are effectively connected, the buckle can be pulled backwards to make the lock catch move backwards to compress the spring, so as to release the rotary shaft, and then folding is easily achieved.

Preferably, a round hole is formed in the rear end of the lock catch, the diameter of the round hole is matched with that of the spring, and the spring extends into the round hole. Because the spring extends into the round hole, the stability of the spring is improved, and deviation or distortion of the spring is prevented; and the elastic force from the spring is transmitted forwards along the axis of the handle, so that the rotary shaft can be locked.

Preferably, a plurality of concave-convex grooves are formed in the surface of the buckle. The concave-convex grooves increase the friction between the hand and the buckle, so that the buckle can be conveniently pulled by users.

Preferably, an included angle between the two clamping grooves is 180°. When the dip net is folded, an included angle between the handle and the hoop is 0°, so that the overall thickness of the dip net is decreased, and the dip net can be transported and carried conveniently. When the dip net is unfolded, the included angle between the handle and the hoop is 180°, the length of the dip net is maximized, and fish at a distance can be scooped.

Preferably, the outer side of the handle is wrapped with an outer ferrule which is made from a buoyant material, and the surface of the outer ferrule is provided with a plurality of anti-slip pits. The handle can be held more comfortably by means of the outer ferrule. Meanwhile, the outer ferrule is made from a buoyant material, so that when accidentally falling into water, the dip net can float up to be fished conveniently; and the anti-slip pits in the surface of the outer ferrule can improve the friction between the handle and the hand, so that the dip net is unlikely to slip out of the hand.

Preferably, a strap is fixed to the rear end of the handle. During fishing, users can hang the dip net on their shoulders with the strap before a fish is caught, so as to carry the dip net conveniently and effortlessly.

Preferably, an end cover is arranged at the front end of the base body and is connected with the base body in a buckled manner. The end cover has a sealing effect, so that water is prevented from entering the hoop mounting base during fish scooping, which may otherwise cause rusting of the spring and the rotary shaft in the hoop mounting base under a humid condition; and the quality of the spring and the rotary shaft is guaranteed, locking is facilitated, and the service life of the dip net is prolonged.

Preferably, the hoop mounting base is connected with the handle in a threaded manner. The handle and the hoop mounting base are of a detachable structure and can be separated to reduce the size during transportation, so that transpiration and carrying are facilitated, and the transportation cost is reduced.

Compared with the prior art, the technical solution adopted by the present invention has the following beneficial effects:

1. According to the dip net provided with the lockable and foldable handle, the hoop is connected with the hoop mounting base through the rotary shaft, the handle and the hoop are foldable and can be folded to reduce the size for transportation and carrying, and thus, the dip net can be carried conveniently; when the dip net is used, the handle and the hoop are unfolded; and compared with traditional dip nets which need to be assembled before use, the dip net of the invention is more convenient to use and capable of saving time and labor.

2. The spring, the lock catch and the buckle in the hoop mounting base are matched to lock the rotary shaft; when the handle and the hoop need to be folded, the buckle is pulled backwards to make the lock catch move backwards, then the rotary shaft is released by the lock catch, and the spring is compressed, so that the handle and the hoop are folded; and when the hoop needs to be locked, the buckle is released, and the lock catch is pushed by the elastic force from the spring to move forwards to lock the rotary shaft. By adoption of such structure, forces can be reasonably transmitted. Compared with the 360° gear-type fish basket adjustment device mentioned in the description of related art, the dip net of the invention is easier to operate, stable in structure after being locked, and long in service life.

REFERENCE SIGNS 1, handle; 2, hoop mounting base; 3, hoop; 11, outer ferrule; 12, anti-slip pit; 13, strap; 20, end cover; 21, base body; 22, spring; 23, lock catch; 24, buckle; 25, rotary shaft; 28, buckle sliding groove; 29, protrusion; 30, clamping groove; 31, connecting piece; 231, through hole; 232, round hole; 241, pin; 242, concave-convex groove.

DETAILED DESCRIPTION OF THE INVENTION

For a better understanding of the invention, the invention is expounded below with reference to embodiments. The following embodiments are used to explain the invention, but are not intended to limit the scope of the invention.

Figure 1:
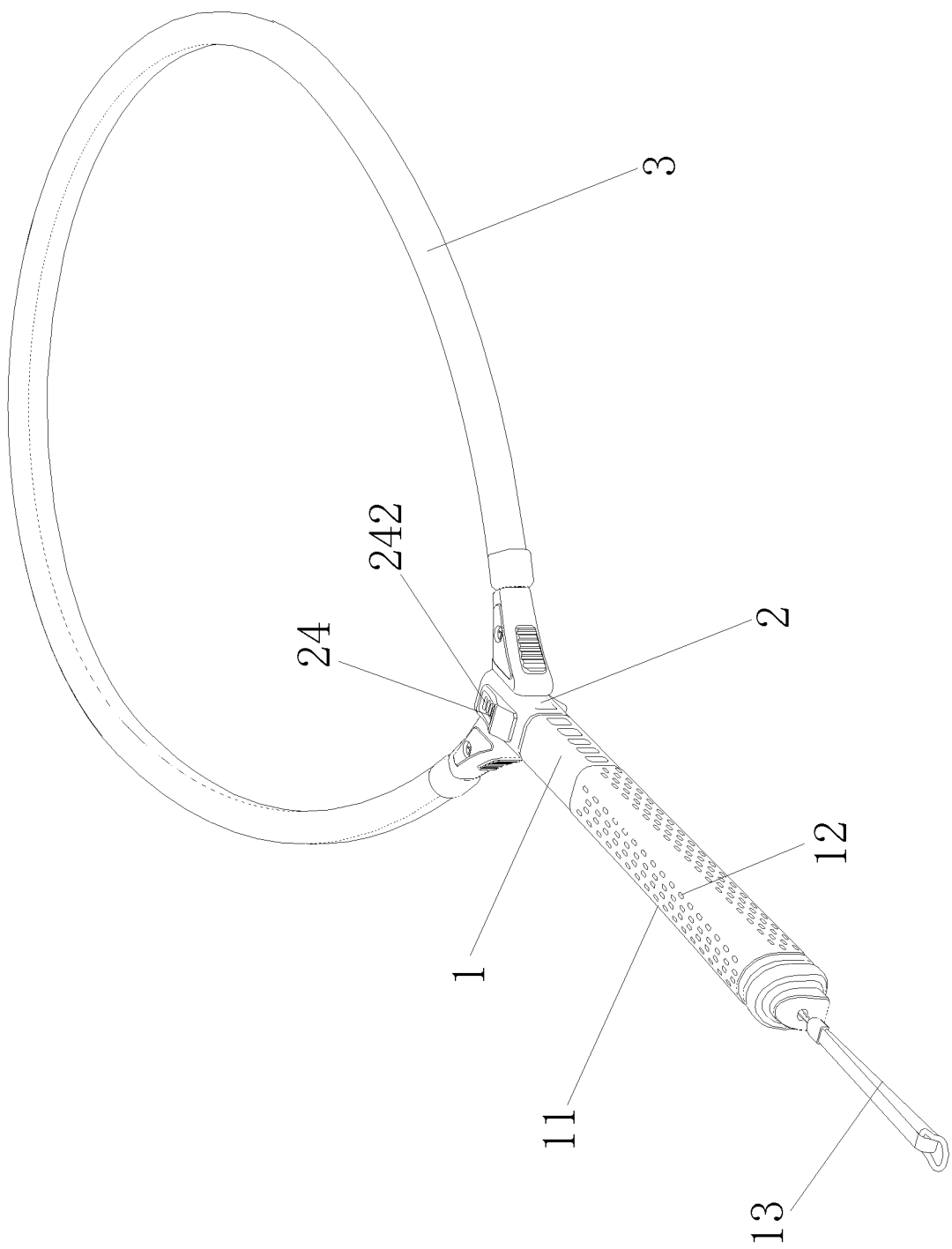
FIG. 1 is a perspective view of a dip net provided with a lockable and foldable handle of the invention.
Figure 2:
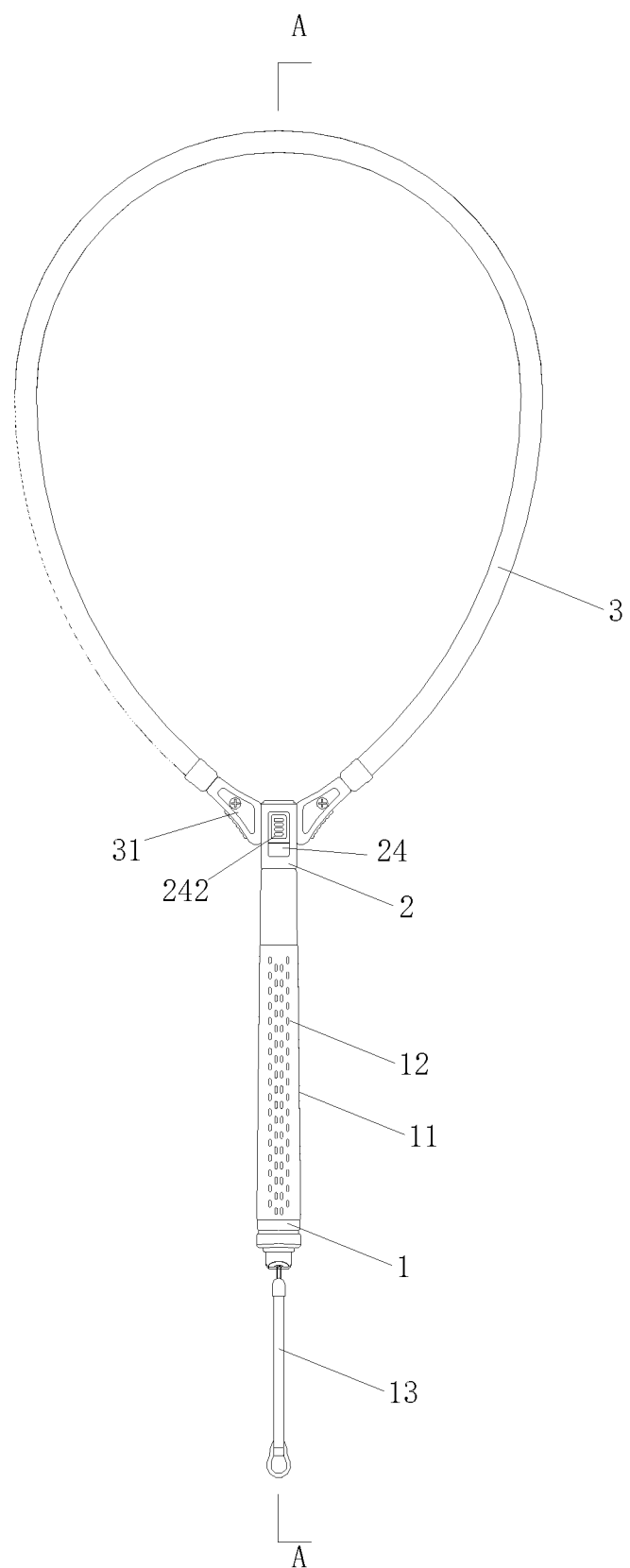
FIG. 2 is a front view of the dip net provided with the lockable and foldable handle of the invention.
Figure 3:
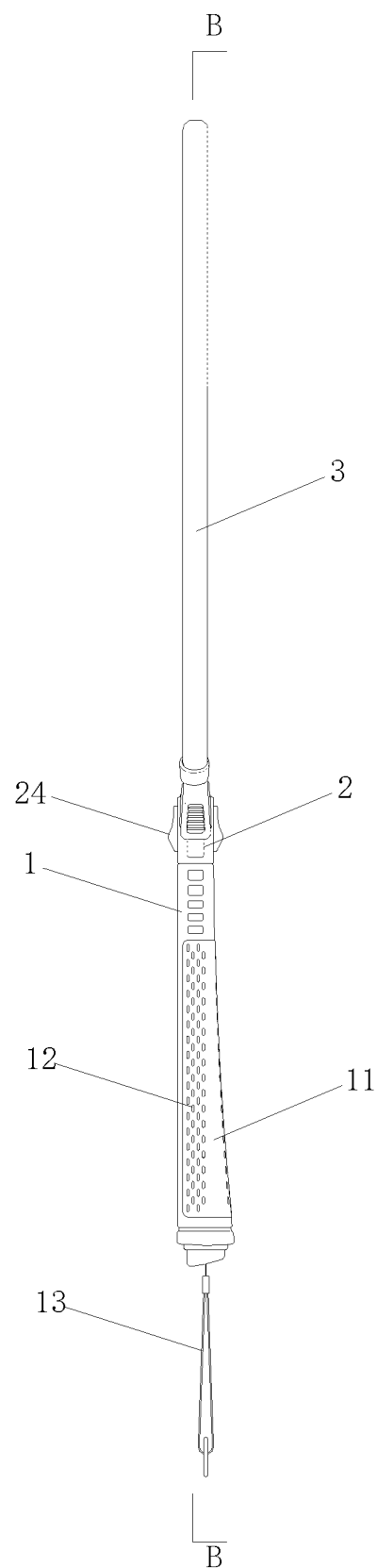
FIG. 3 is a side view of the dip net provided with the lockable and foldable handle in an unfolded state.

As shown in FIGS. 1-3, the invention relates to a dip net provided with a lockable and foldable handle. The dip net comprises a handle 1, a hoop 3 and a hoop mounting base 2. The hoop mounting base 2 is fixed to the front end of the handle 1. The hoop mounting base 2 is fixed to the handle 1 or is detachably connected to the handle 1 in a threaded manner (not shown). The outer side of the handle 1 is wrapped with an outer ferrule 11 which is made from a buoyant material. A plurality of anti-slip pits 12 are formed in the surface of the outer ferrule 11. The handle 1 can be held more comfortably by means of the outer ferrule 11. Meanwhile, the outer ferrule 11 is made from a buoyant material, so that when accidentally falling into water, the dip net can float up to be fished conveniently. The anti-slip pits 12 in the surface of the outer ferrule 11 can improve the friction between the handle and the hand, so that the dip net is unlikely to slip out of the hand. A strap 13 is fixed to the rear end of the handle 1, and users can hang the dip net on their shoulders by means of the strap 13.

Figure 4:
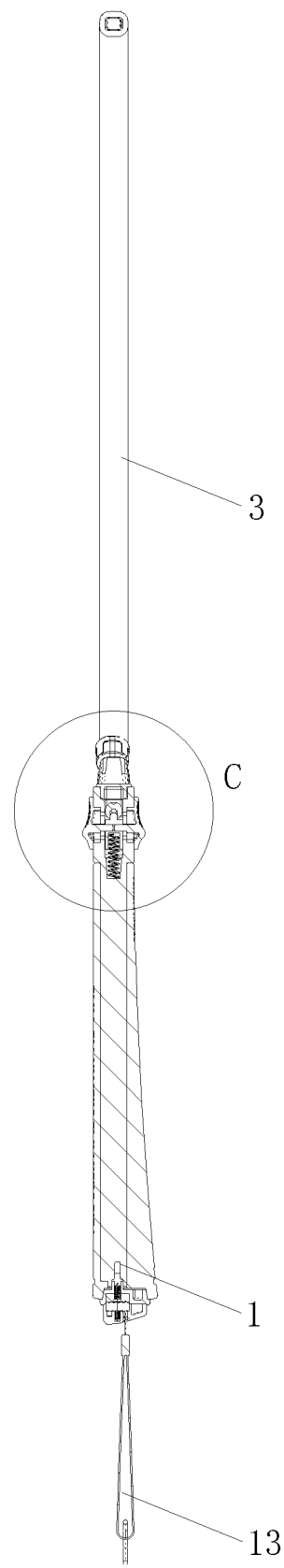
FIG. 4 is a sectional view of the dip net provided with the lockable and foldable handle along A-A in FIG. 2.
Figure 5:
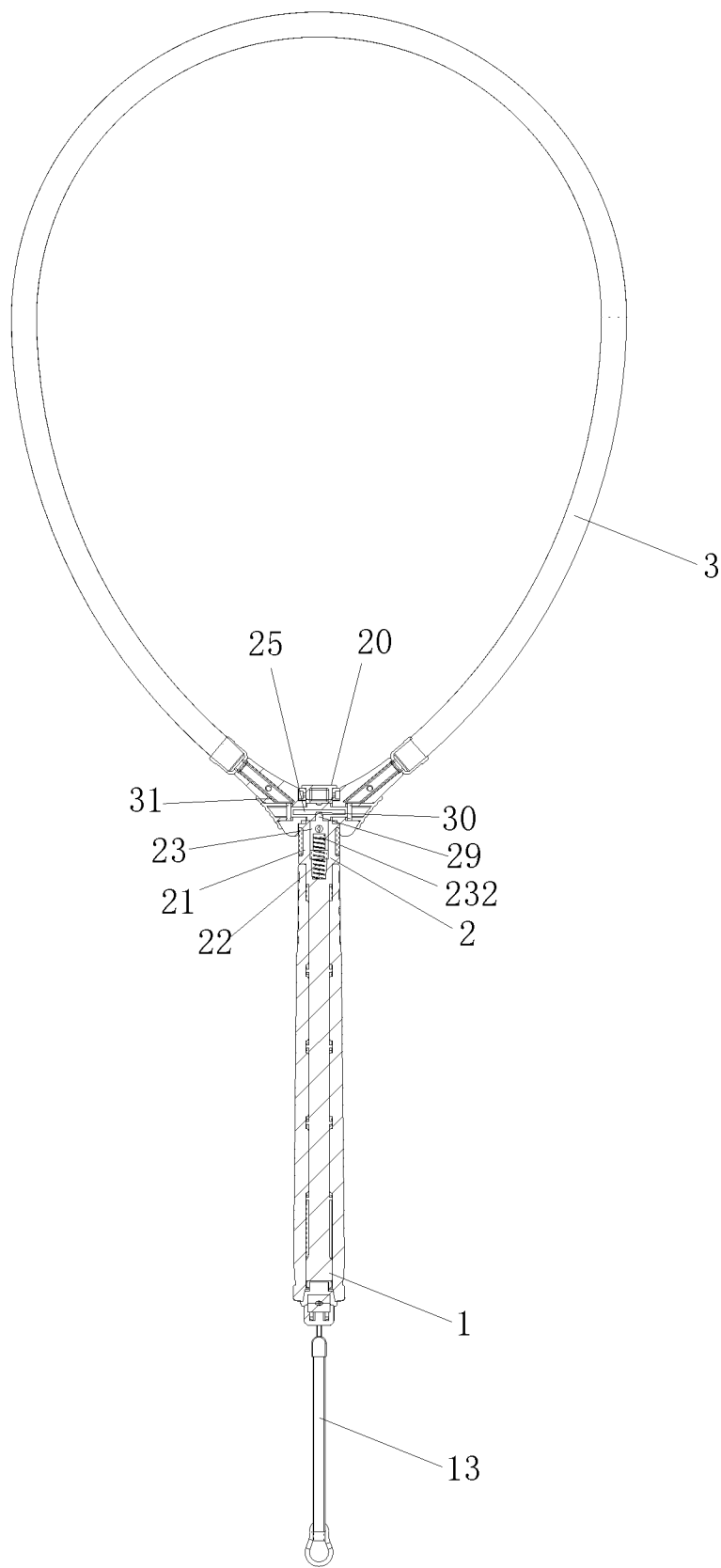
FIG. 5 is a sectional view of the dip net provided with the lockable and foldable handle along B-B in FIG. 3.
Figure 6:
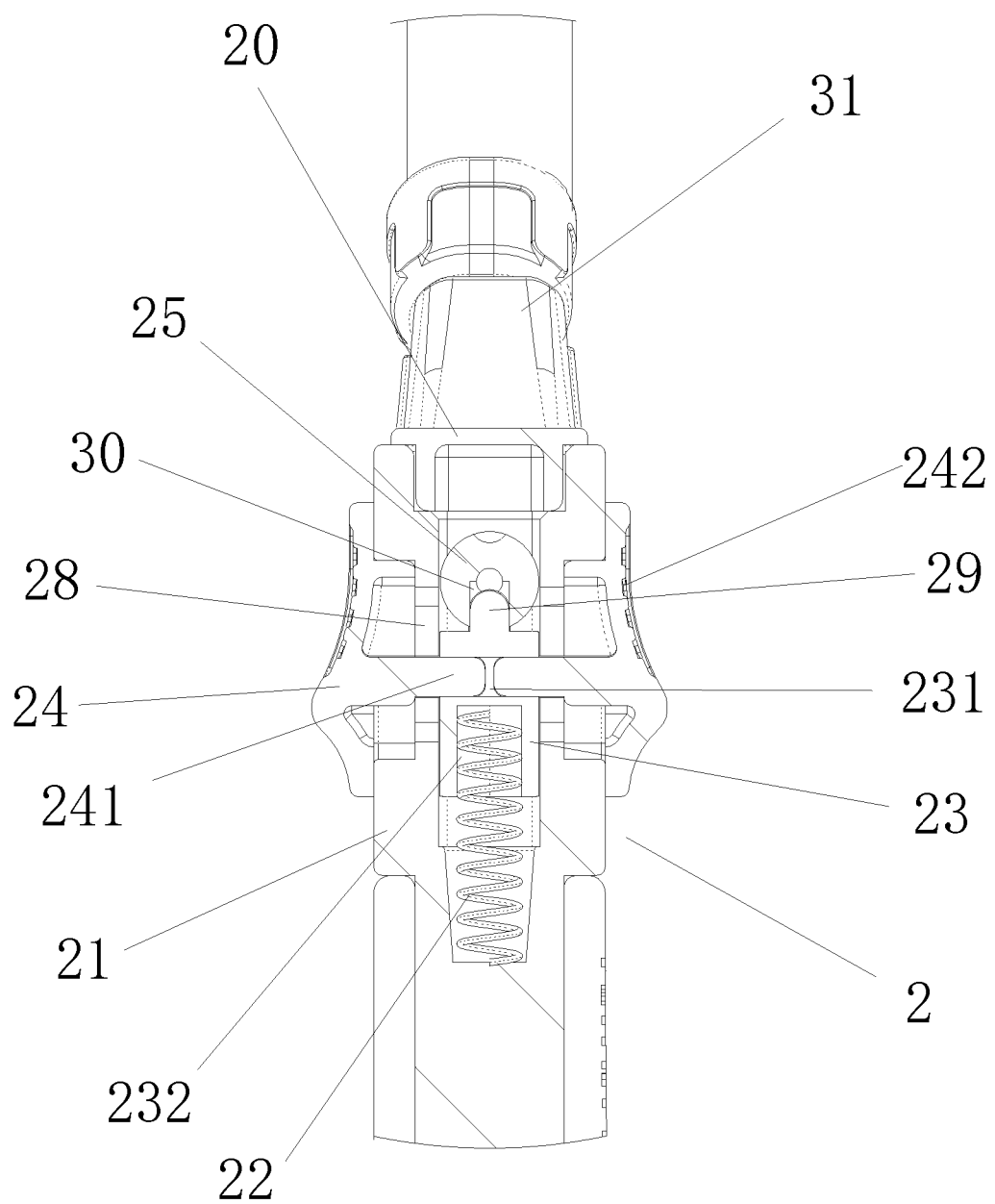
FIG. 6 is a partial enlarged view of a joint C, shown in FIG. 4, of the dip net provided with the lockable and foldable handle.

As shown in FIGS. 4-6, the hoop mounting base 2 comprises a base body 21, a rotary shaft 25 and a lock device, wherein the lock device comprises a spring 22, a lock catch 23 and a buckle 24, and the base body 21 is provided with a buckle sliding groove 28. The buckle 24 and the spring 22 are both mounted in the base body 21. The buckle 24 is provided with a through hole 231 which vertically penetrates through the buckle 24. A round hole 232 is formed in the rear end of the buckle 24. The diameter of the spring 22 is slightly smaller than that of the round hole 232, the front half portion of the spring 22 extends into the round hole 232 and is in close contact with the buckle 24, and a protrusion is arranged at the front end of the buckle 24. An end cover 20 is arranged at the front end of the base body 21, is connected with the base body 21 in a buckled manner, and has a sealing effect, so that water is prevented from entering the hoop mounting base during fish scooping, which may otherwise cause rusting of the spring and the rotary shaft in the hoop mounting base under a humid condition; and the quality of the spring and the rotary shaft is guaranteed, locking is facilitated, and the service life of the dip net is prolonged.

As shown in FIGS. 4-6, the buckle 24 is mounted in the buckle sliding groove 28 and is connected with the base body 21 in a manner of sliding forwards or backwards. A pin 241 is arranged in the buckle 24 and is inserted into the through hole 231, so that the buckle 24 and the lock catch 23 are connected into a whole and are fixed together. A plurality of concave-convex grooves 242 are formed in the surface of the buckle 24 and are used for increasing the friction between the hand and the buckle 24 when the buckle 24 is pulled by hand, and thus, the buckle 24 can be conveniently pulled by users.

Figure 7:
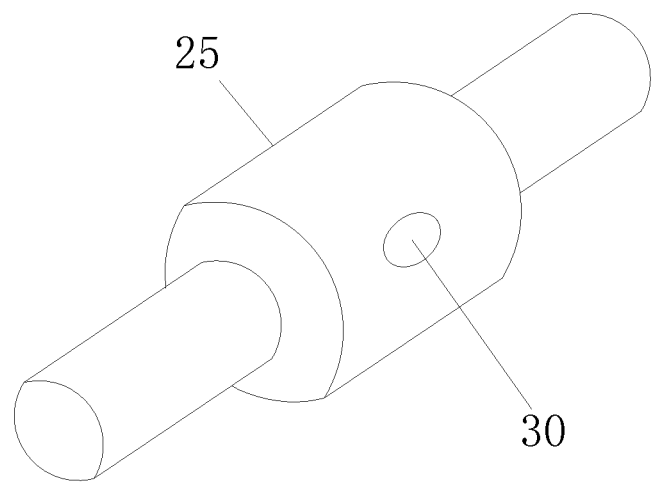
FIG. 7 is a structure view of a rotary shaft.
Figure 8:
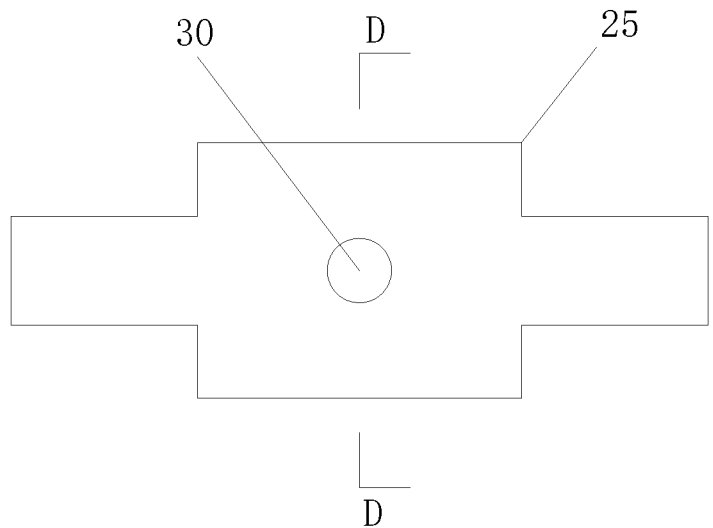
FIG. 8 is a front view of the rotary shaft.
Figure 9:
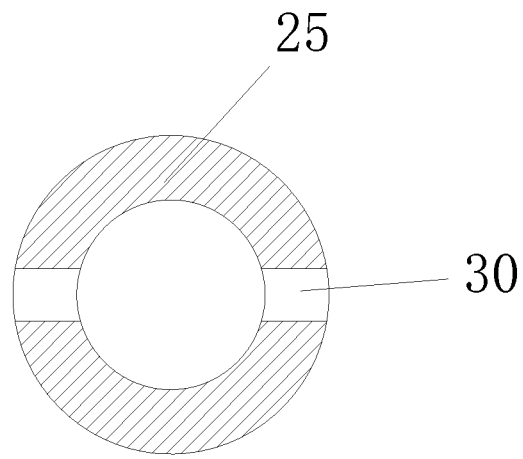
FIG. 9 is a sectional view of the rotary shaft along D-D.

As shown in FIGS. 4-6, the rotary shaft 25 is mounted in the base body 21, and a shaft seat can rotate around the rotary shaft 25 if not restrained. As shown in FIGS. 7-9, the rotary shaft 25 is provided with at least two clamping grooves 30 in a circumferential direction. For instance, in this embodiment, the rotary shaft 25 is provided with two clamping grooves 30, and an included angle between the two clamping grooves 30 is 180°; when the hoop 3 and the handle 1 are totally unfolded, one clamping groove 30 is matched with the protrusion 29; when the hoop 3 and the handle 1 are totally folded, the other clamping groove 30 is matched with the protrusion 29; and after the protrusion 29 is inserted into any one of the two clamping grooves 30, the spring 22 pushes the buckle 23 forwards, and then the rotary shaft 25 is locked by the protrusion 29 and cannot rotate anymore.

As an example, the rotary shaft is provided with two clamping grooves 30 in this embodiment. In actual implementation, the rotary shaft can be provided with a plurality of clamping grooves 30, so that the angle between the hoop 3 and the handle 1 can be changed according to the height of fishermen and the distance to fish, and then the overall length of the dip net is changed to achieve a better fish scooping effect.

Figure 10:
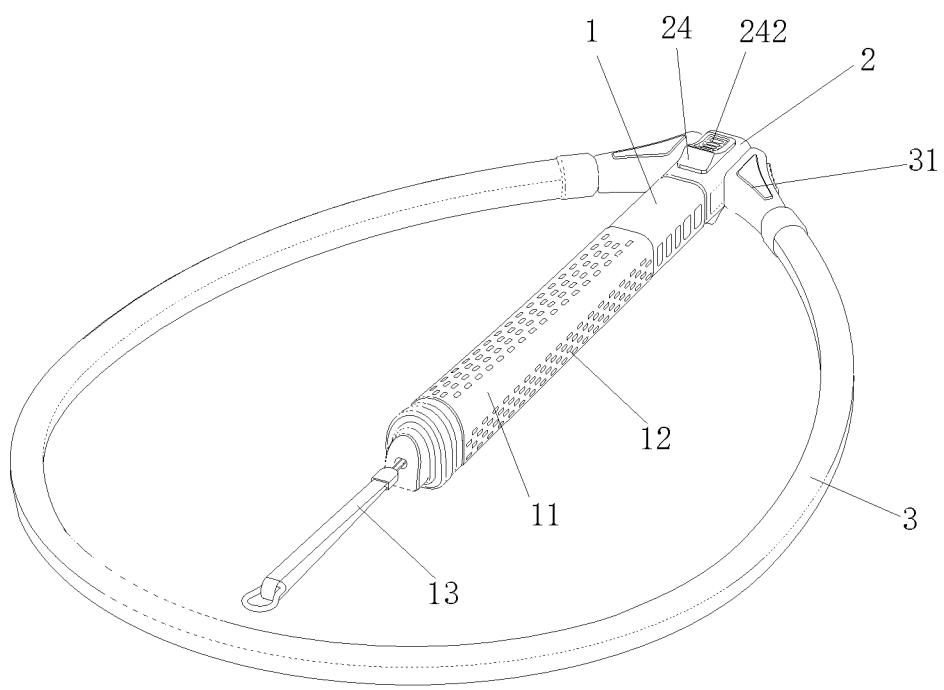
FIG. 10 is a schematic diagram of the dip net provided with the lockable and foldable handle in a folded state of the invention.

When the dip net provided with the lockable and foldable handle is transported or carried, the handle 1 and the hoop 3 are folded into a structure shown in FIG. 10, and the handle 1 is entirely folded into the space defined by the hoop 3 to reduce the size of the whole dip net, so that the dip net can be carried conveniently; at this moment, the spring 22 abuts against the buckle 23, and the protrusion 29 at the front end of the buckle 23 is just clamped in one clamping groove 30 of the rotary shaft 25, so that the rotary shaft 25 is restrained by the buckle 23 and cannot rotate, collision to the dip net caused by random rotation of the handle 1 and the hoop 3 during carrying is avoided, and the dip net can be carried conveniently. When the dip net is about to be used for scooping fish, the buckle 24 is pulled backwards by hand and then drives the lock catch 23 to move backwards to compress the spring 22, the rotary shaft 25 is not retrained by the protrusion 29 anymore, at this moment, the handle 1 is rotated to be unfolded, and the buckle 24 is released; and when the other clamping groove 30 of the rotary shaft 25 rotates to be aligned to the protrusion 29, the spring 22 restores to the original length and pushes the lock catch 23 to move forwards, then the protrusion 29 is inserted into the clamping groove 30 to lock the rotary shaft 25, the hoop 3 cannot rotate anymore, and the stability of the dip net is guaranteed when the dip net is used for scooping fish.

The present invention is expounded above with reference to embodiments, but these embodiments are only preferred ones of the invention and are not intended to limit the implementation scope of the invention. Any variations and improvements achieved within the application range of the invention should also under the patent coverage of the invention.

What is claimed is:

1. A dip net provided with a lockable and foldable handle, comprising a handle, a hoop and a hoop mounting base, wherein the hoop mounting base is fixed to a front end of the handle and comprises a base body, a rotary shaft and a lock device; the rotary shaft and the lock device are both mounted in the base body; connecting pieces are arranged at two ends of a rear side of the hoop and are respectively connected with two ends of the rotary shaft; the rotary shaft is provided with two clamping grooves in a circumferential direction; when the handle is unfolded, the lock device is matched with one of said clamping grooves to realize locking; and when the handle is folded, the lock device is matched with an other of said clamping grooves to achieve locking; wherein the lock device comprises a spring, a lock catch and a buckle; the base body is provided with a buckle sliding groove, and the lock catch and the spring are both mounted in the base body; the lock catch has a rear end in close contact with a front end of the spring and a front end provided with a protrusion; the buckle is mounted in the buckle sliding groove, is connected with the base body in a manner of sliding forwards or backwards, and is fixed to the lock catch; and the protrusion is matched with one of said clamping grooves.

2. The dip net provided with the lockable and foldable handle according to claim 1, wherein the buckle is provided with a through hole which vertically penetrates through the buckle, and a pin is arranged in the buckle and is inserted into the through hole.

3. The dip net provided with the lockable and foldable handle according to claim 1, wherein a round hole is formed in a rear end of the buckle and has a diameter matched with a diameter of the spring, and the spring extends into the round hole.

4. The dip net provided with the lockable and foldable handle according to claim 1, wherein a surface of the buckle is provided with a plurality of concave-convex grooves.

5. The dip net provided with the lockable and foldable handle according to claim 1, wherein an included angle between the two clamping grooves is 180°.

6. The dip net provided with the lockable and foldable handle according to claim 1, wherein an outer side of the handle is wrapped with an outer ferrule which is made from a buoyant material, and a surface of the outer ferrule is provided with a plurality of anti-slip pits.

7. The dip net provided with the lockable and foldable handle according to claim 1, wherein a strap is fixed to a rear end of the handle.

8. The dip net provided with the lockable and foldable handle according to claim 1, wherein an end cover is arranged at a front end of the base body and is connected with the base body in a buckled manner.

* * * * *